(12) United States Patent
Chang

(10) Patent No.: US 7,065,915 B2
(45) Date of Patent: *Jun. 27, 2006

(54) ELECTRIC SHOCK GUN

(76) Inventor: Hung-yi Chang, No. 1, Alley 8, Lane 290, Sec. 2, Fengsh Rd., Fengyuan City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/982,669

(22) Filed: Nov. 5, 2004

(65) Prior Publication Data

US 2005/0188887 A1     Sep. 1, 2005

Related U.S. Application Data

(63) Continuation-in-part of application No. 10/202,812, filed on Jul. 25, 2002, now Pat. No. 6,862,994.

(51) Int. Cl.
*F41A 19/58* (2006.01)
*F42B 30/02* (2006.01)

(52) U.S. Cl. .......................... 42/84; 89/28.05; 102/502

(58) Field of Classification Search ............... 102/502, 102/293; 361/232; 42/1.08, 106, 84; 89/1.11, 89/1.1, 28.05, 28.1, 28.2; 119/908, 174; 463/47.3

See application file for complete search history.

(56) References Cited

U.S. PATENT DOCUMENTS

| | | | |
|---|---|---|---|
| 3,523,538 A | 8/1970 | Shimizu | 607/58 |
| 3,803,463 A | 4/1974 | Cover | 361/232 |
| 4,213,392 A * | 7/1980 | Usel | 102/431 |
| 5,044,278 A * | 9/1991 | Campbell | 102/202.8 |
| 5,473,501 A | 12/1995 | Claypool | 361/232 |
| 5,654,867 A | 8/1997 | Murray | 361/232 |
| 5,698,815 A | 12/1997 | Ragner | 102/502 |
| 5,750,918 A | 5/1998 | Mangolds et al. | 102/502 |
| 5,786,546 A | 7/1998 | Simson | 102/438 |
| 5,831,199 A | 11/1998 | McNulty et al. | 89/1.11 |
| 5,962,806 A | 10/1999 | Coakley et al. | 102/502 |
| 6,354,033 B1 * | 3/2002 | Findley | 42/84 |
| 6,636,412 B1 | 10/2003 | Smith | 361/232 |
| 6,679,180 B1 | 1/2004 | Warnagiris et al. | 102/502 |
| 6,880,466 B1 * | 4/2005 | Carman | 102/502 |

* cited by examiner

*Primary Examiner*—Michael J. Carone
*Assistant Examiner*—James S. Bergin
(74) *Attorney, Agent, or Firm*—Alan D. Kamrath; Nikolai & Mersereau, P.A.

(57) ABSTRACT

An electric shock gun includes a barrel for receiving electrode bullets and a trigger which controls a firing device received in a rear end of the gun. The firing device includes an electric power source and a charging device. Each electrode bullet has two spines on a first end thereof and a conductive block on a second end and the firing device is electrically connected to the conductive block. Each electrode bullet includes a capacitor which is charged within a short period of time and connected to the spines and the conductive block. The electrode bullet goes out from the barrel by pulling the trigger.

5 Claims, 8 Drawing Sheets

ELECTRIC SHOCK GUN

CROSS-REFERENCE TO RELATED APPLICATION

This application is a Continuation-In-Part application of Ser. No. 10/202,812, filed 25 Jul. 2002 now U.S. Pat. No. 6,862,994, and entitled "ELECTRIC SHOCK GUN AND ELECTRODE BULLET."

FIELD OF THE INVENTION

The present invention relates to an electric gun having a plurality of electrode bullets each have two electrodes in a form of a spine, both of which are powered by a capacitor in the bullet. The capacitor is charged within a short period of time by pulling the trigger.

BACKGROUND OF THE INVENTION

A conventional electric shock gun for ejecting two water beams is disclosed in FIG. 7, the gun has a pressurized tank 100 and two tanks 101 each filled with water are located in front of the pressurized tank 100. The two tanks 101 have two respective nozzles which are charged with high voltage so that when pulling the trigger 102, the two water beams are ejected out from the nozzles and may contact an animal or any conductive object and the current causes the animal to be paralytic or lost of ability of action. However, the pressure stored by the tanks can only send the water beams to a short distance and it will be a severe problem if the water leaks which could injury the user who holding the gun.

Another conventional electric shock gun 40 is shown in FIG. 8 and includes two electrode bullets 41, 42 wherein one of the two electrode bullets 41 is a positive electrode and the other 42 is a negative electrode so that when the two electrode bullets 41, 42 hit an animal or any conductive object, the electric current flows over the object and makes the object to be paralytic or loose the ability of action. The two electrode bullets 41, 42 are connected by two wires 410, 420 which transmit electric current to the two electrode bullets 41, 42. The wires 410, 420 have limited length which decides the range that the electrode bullets 41, 42 can reach. Besides, the animal is likely struggle from the electrode bullets 41, 42 and the wires 410, 420 could be broken and the broken wire de-effects the electrode bullets 41, 42.

The present invention intends to provide an electric shock gun for shooting electrode bullets each of which has a capacitor which is charged when pulling the trigger.

SUMMARY OF THE INVENTION

In accordance with one aspect of the present invention, there is provided an electric shock gun and electrode bullets are received in the gun. The gun comprises a firing device which includes an electric power source and a charging device. A plurality of electrode bullets are received in a magazine in the handle of the gun and each have two spines on a first end thereof and a conductive block on a second end. The firing device is electrically connected to the conductive block. Each electrode bullet includes a capacitor which is charged within a short period of time and connected to the spines and the conductive block.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
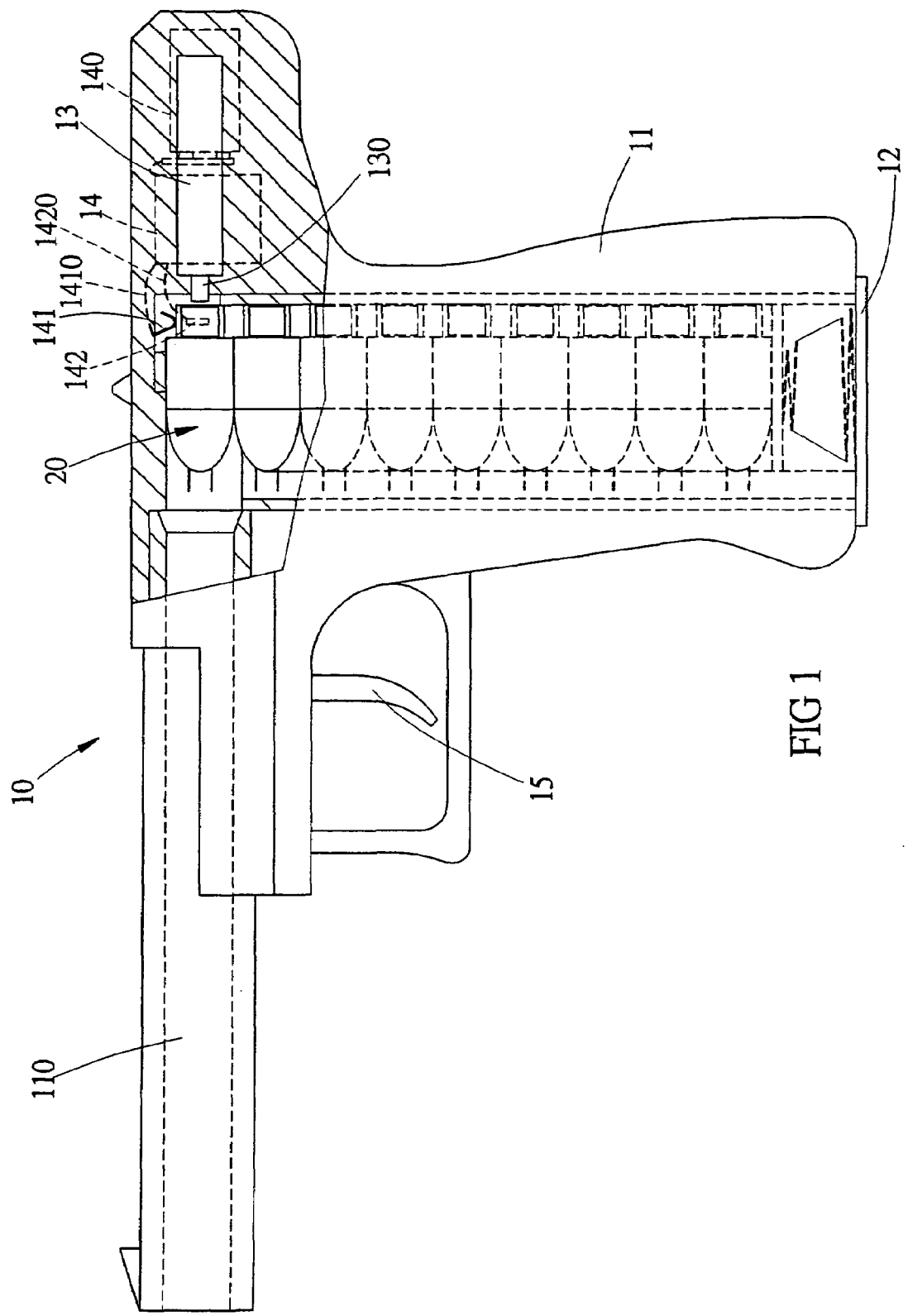
FIG. 1 shows the electrode bullets received in the handle of the electric shock gun of the present invention.
Figure 2:
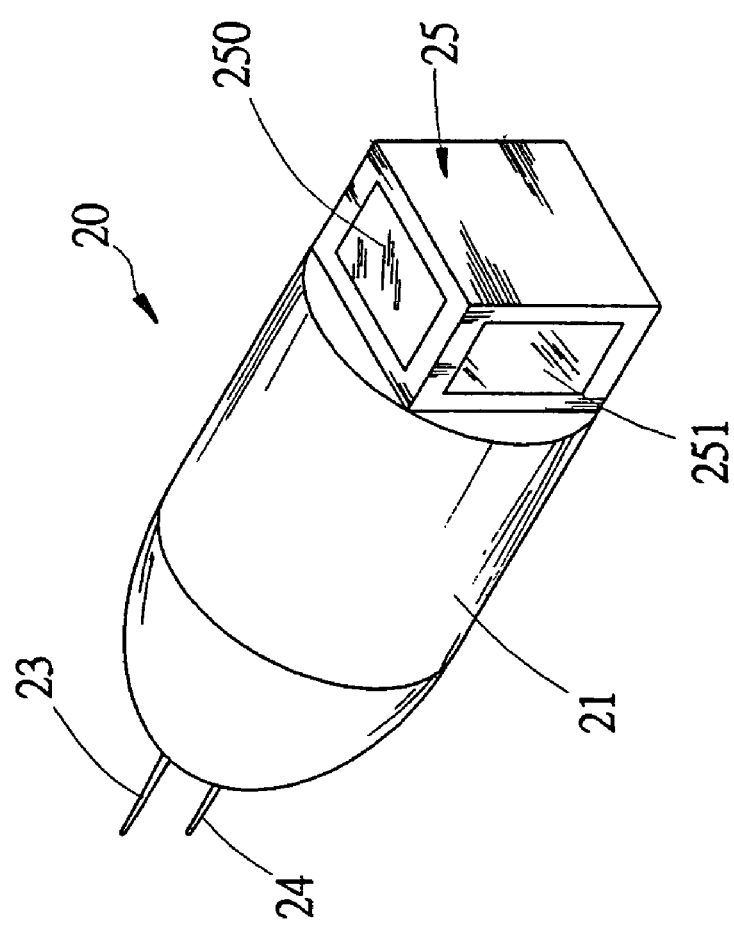
FIG. 2 is a perspective view to show the electrode bullet of the present invention.
Figure 3:
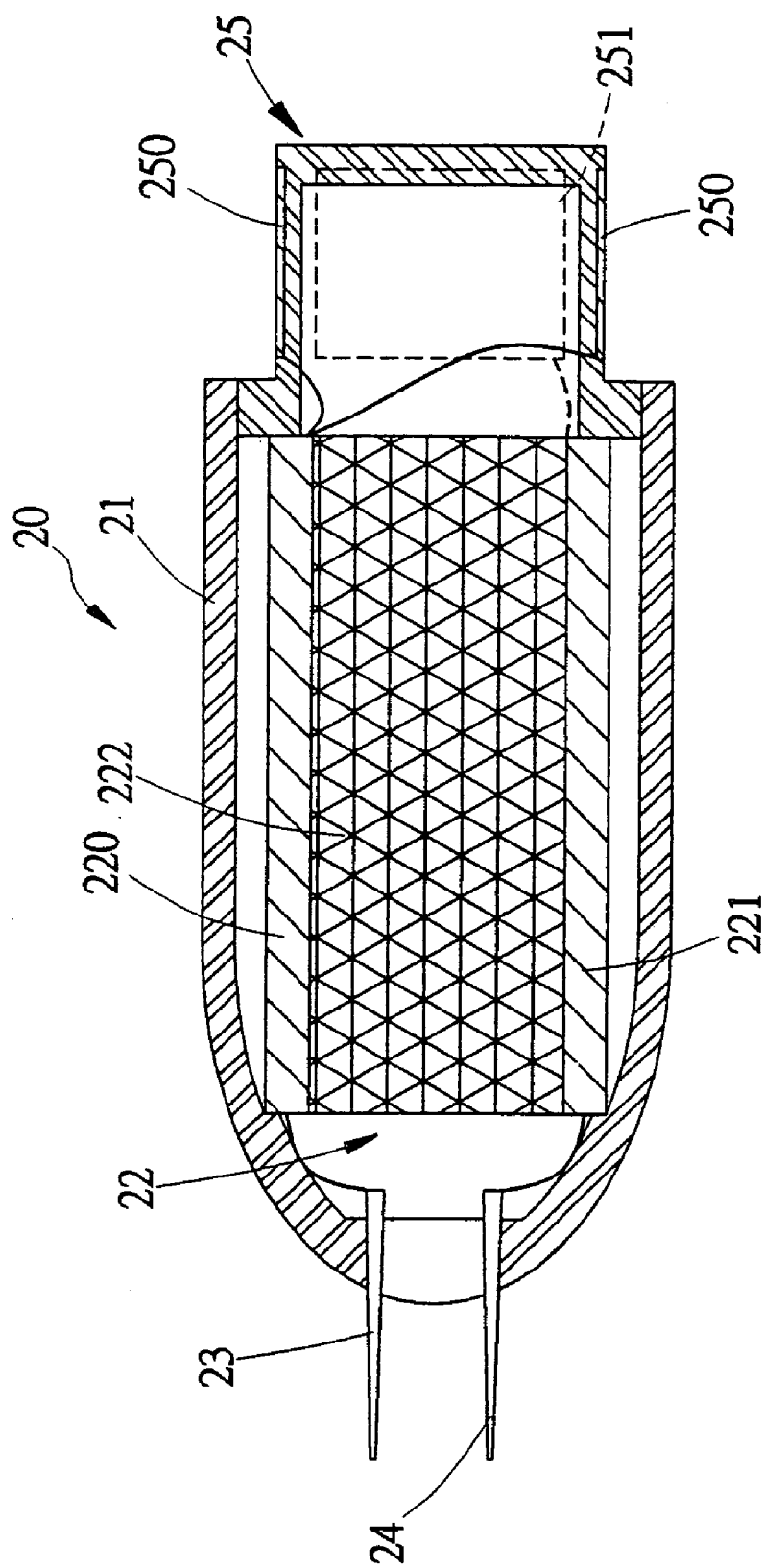
FIG. 3 is a cross sectional view to show the electrode bullet of the present invention.
Figure 4:
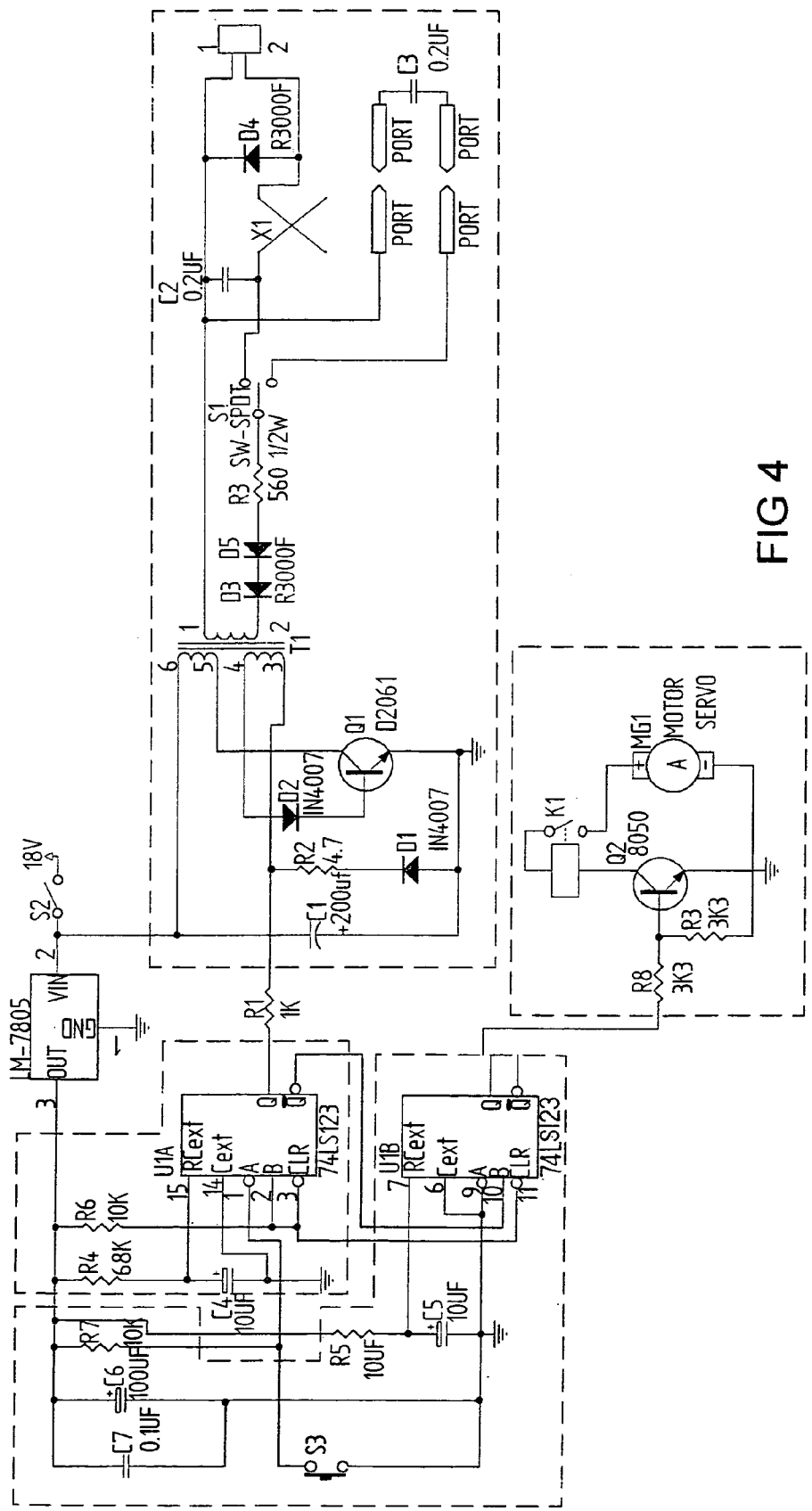
FIG. 4 shows the control circuit of the electric shock gun of the present invention.

Referring to FIGS. 1 to 4, the electric shock gun in accordance with the present invention comprises a gun 10 including a barrel 110, a trigger 15 and a handle 11 in which a magazine 12 is received. A firing device 13 is received in a rear end of the gun 10 and is activated by pulling the trigger 15. The firing device 13 includes a charging device 14 and an electric power source 140 which can be a rechargeable battery or an ordinary battery.

A plurality of electrode bullets 20 are received in the magazine 12 which is removably received in the handle 11 and a biasing member is located in an inside of the magazine 12 so as to push the electrode bullets 20 toward the barrel 110.

Each electrode bullet 20 includes a body 21 and a capacitor 22 is received in the body 21. The capacitor 22 includes a first board 220 and a second board 221 between which conductive agent 222 is received. Two spines 23, 24 extend from a first end of the body 21 and are connected to a positive port which is the first board 220 and a negative port 221 which is the second board 221 of the capacitor 22 respectively. A polygonal conductive block 25 is connected to a second end of the body 21 and two first opposite sides of the conductive block 25 are connected to the positive port 202 and two second opposite sides of the conductive block 25 are connected to the negative port 221 of the capacitor 22. The firing device 13 has a nose 30 which is located behind the conductive block 25 of the first electrode bullet 20 in the barrel 110 of the gun 10.

The firing device 13 further comprises a positive charging member 141 and a negative charging member 142 both of which are connected to the charging device 14 by two wires 1410 and 1420. The positive charging member 141 and the negative charging member 142 are connected to two positive plates 250 on the two first opposite sides of the conductive block 25 and two negative plates 251 on the two second opposite sides of the conductive block 25 respectively.

Figure 5:
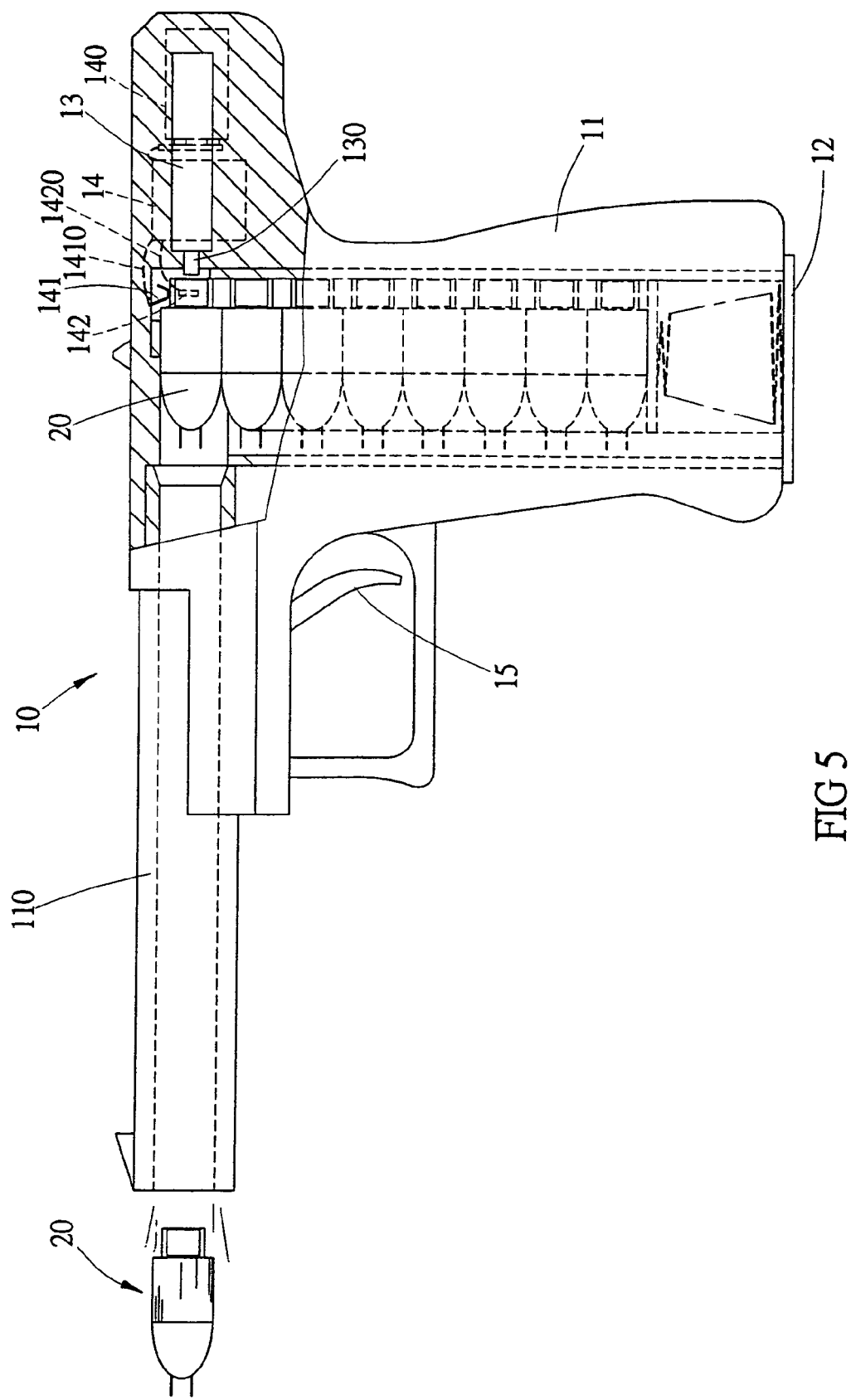
FIG. 5 shows an electrode bullet is shot out when pulling the trigger of the gun.
Figure 6:
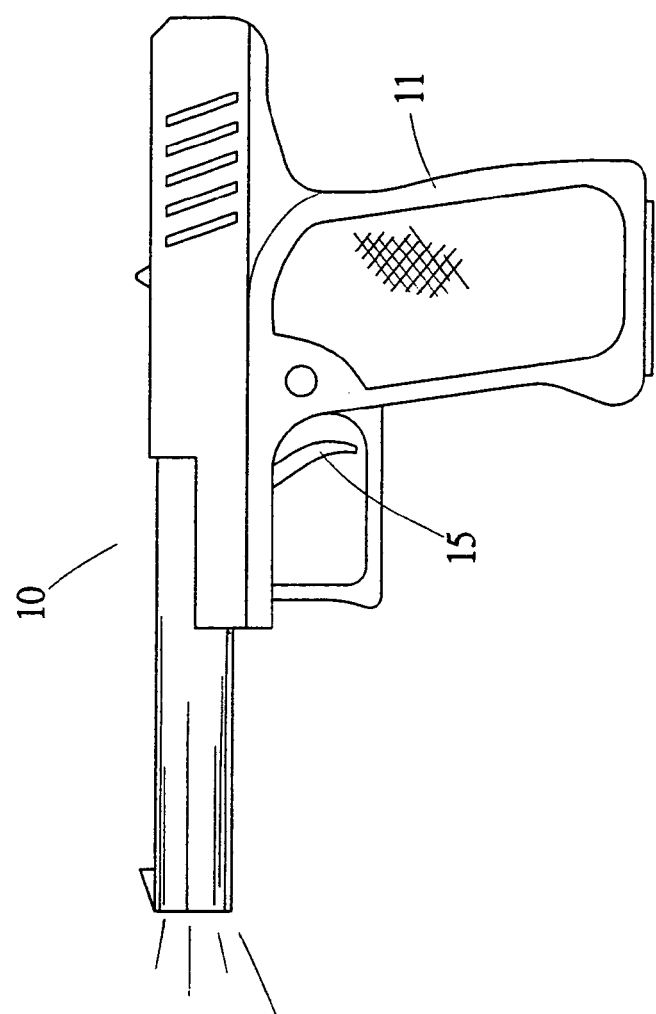
FIG. 6 shows the two spines of the electrode bullet penetrate the skin of the object.
Figure 6:
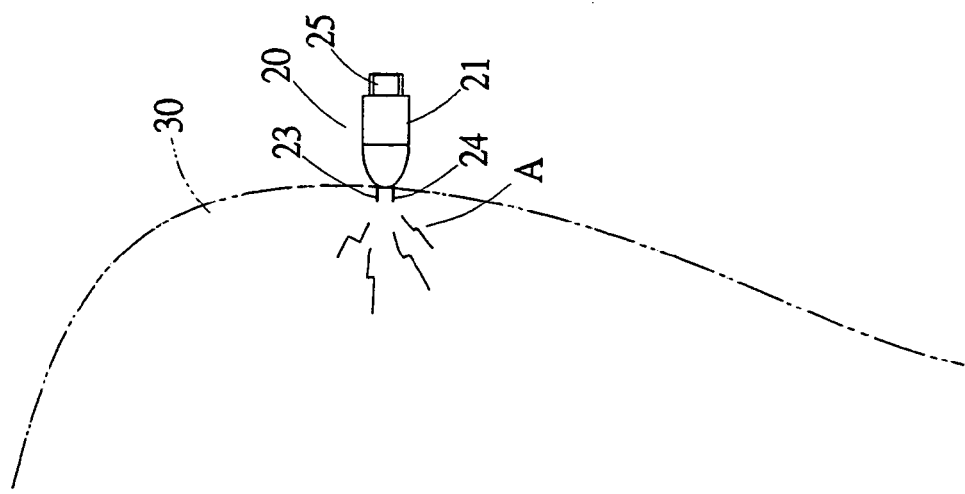
Figure 7:
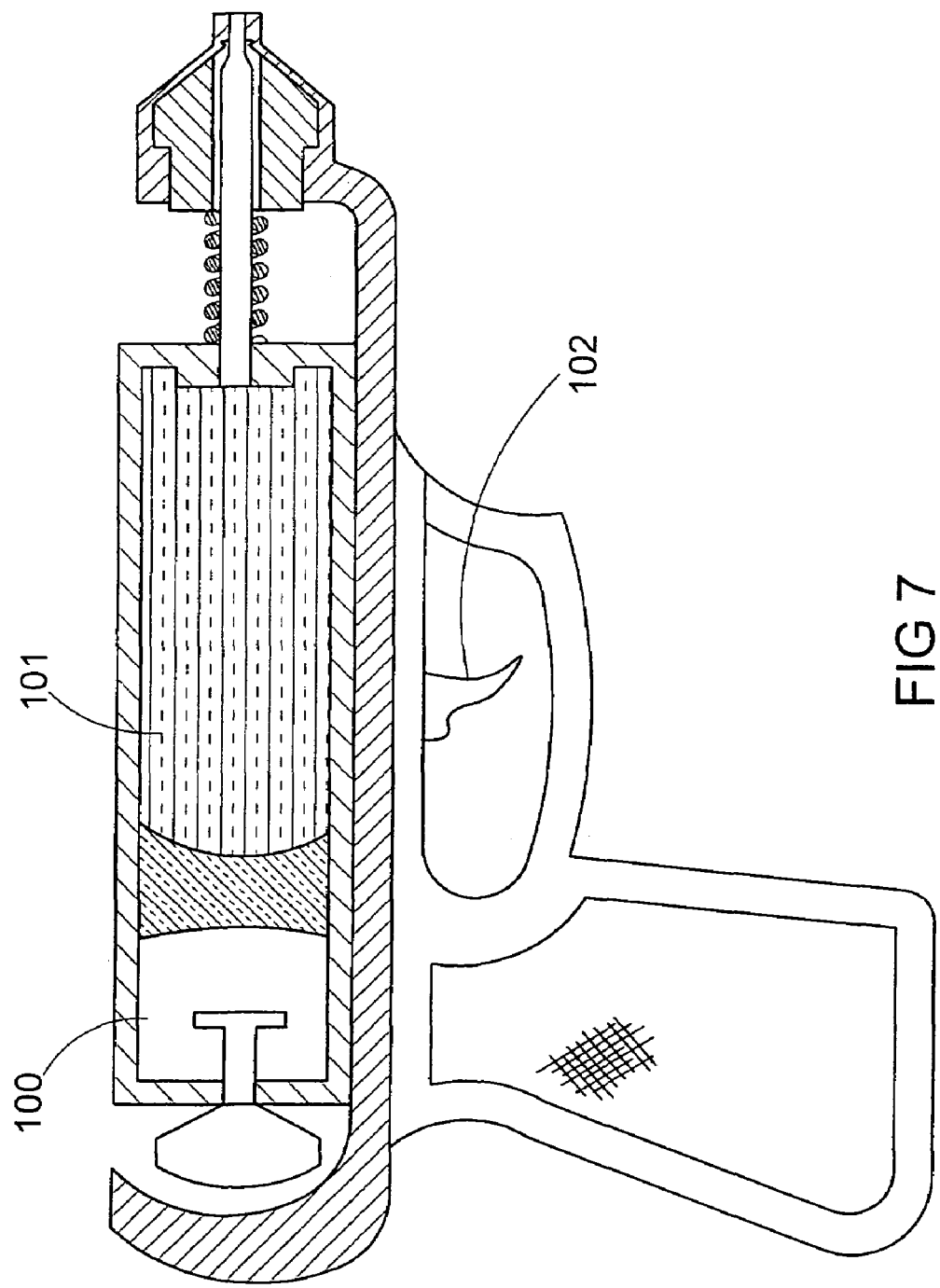
FIG. 7 shows a first conventional electric shock gun.
Figure 8:
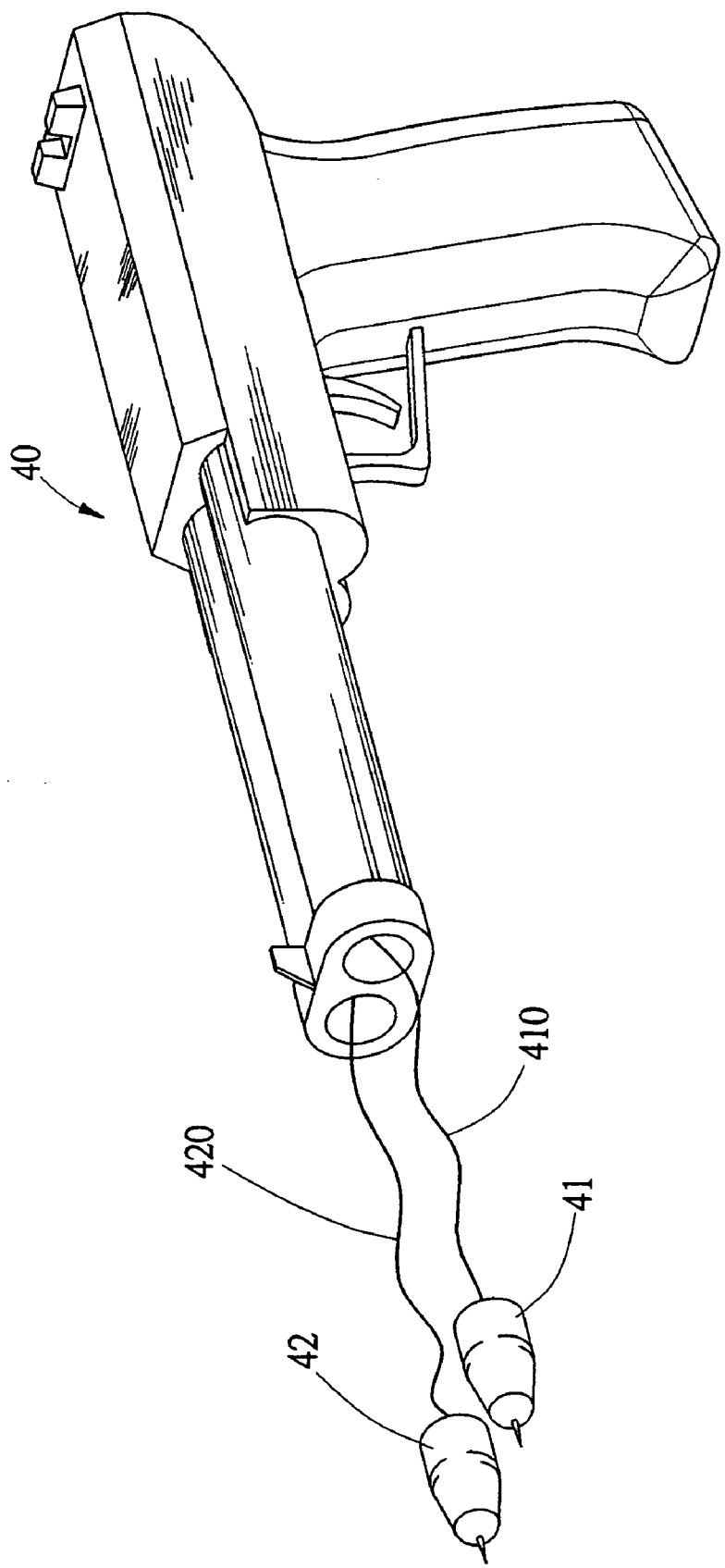
FIG. 8 shows a second conventional electric shock gun.

As shown in FIG. 5, when pulling a first stroke of the trigger 15, the capacitor 22 of the first electrode bullet 20 is charged within a short period of time by the charging device 14. When the trigger 15 is continued to be pulled, the firing device 13 is activated and the nose 130 strikes the conductive block 25 of the first electrode bullet 20 which is then shot out from the barrel 110. As shown in FIG. 6, the two spines 23, 24 penetrate into the skin of the object 30 which can be an animal or a criminal person. The two spines 23, 24 and the body of the animal or the criminal person form a circuit and the current "A" flows to the body of the animal or the criminal person via the two spines 23, 24.

The distance that the electrode bullets 20 reach is much far when compared with the distance of the electrode bullets from a conventional electric shock gun.

It is to be noted that the electrode bullets 20 are charged only before shooting so that the user does not be shocked by touching the spines 23, 24.

Although the invention has been explained in relation to its preferred embodiment, it is to be understood that many other possible modifications and variations can be made without departing from the spirit and scope of the invention as hereinafter claimed.

What is claimed is:

1. An electric shock gun comprising:
   a gun having a barrel for receiving multiple electrode bullets and a trigger, a firing device received in a rear end of the gun and being activated by pulling the trigger, the firing device including an electric power source and a charging device, wherein each of the multiple electrode bullet comprises a body and a capacitor received in the body;
   two spines extending from a first end of the body and connected to a positive port and a negative port of the capacitor respectively;
   a polygonal conductive block connected to a second end of the body and having two first opposite sides of the conductive block connected to the positive port of the capacitor and two second opposite sides of the conductive block connected to the negative port of the capacitor, wherein the firing device is connected to the conductive block.

2. The electric shock gun as claimed in claim 1, wherein the firing device comprises a positive charging member and a negative charging member both of which are connected to the charging device, the positive charging member and the negative charging member connected to the two first opposite sides of the conductive block and the two second opposite sides of the conductive block respectively.

3. The electric shock gun as claimed in claim 1 further comprising a magazine received in a handle of the gun and the electrode bullets received in the magazine, a biasing member located in an inside of the magazine so as to push the electrode bullets toward the barrel.

4. The electric shock gun as claimed in claim 1, wherein the electric power source device is a rechargeable battery.

5. The electric shock gun as claimed in claim 1, wherein the electric power source device is a battery.

* * * * *